United States Patent
Hsieh et al.

(10) Patent No.: US 7,990,733 B2
(45) Date of Patent: Aug. 2, 2011

(54) MOUNTING APPARATUS FOR PCI CARD

(75) Inventors: Chung-Cheng Hsieh, Taipei Hsien (TW); Ching-Wei Hsu, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/713,280

(22) Filed: Feb. 26, 2010

(65) Prior Publication Data

US 2011/0110056 A1    May 12, 2011

(30) Foreign Application Priority Data

Nov. 11, 2009  (CN) .......................... 2009 2 0314532

(51) Int. Cl.
    *H05K 5/00* (2006.01)
(52) U.S. Cl. .......................... 361/759; 361/796; 361/801
(58) Field of Classification Search ............. 361/679.01, 361/724–728, 736, 747, 748, 752, 754, 759, 361/784, 796, 798, 801; 312/223.1, 223.2; 439/55, 61, 296, 325, 327, 374, 377
    See application file for complete search history.

(56) References Cited

U.S. PATENT DOCUMENTS

| 5,822,196 | A  | * | 10/1998 | Hastings et al. | ............. | 361/801 |
| 6,480,392 | B1 | * | 11/2002 | Jiang | ............................. | 361/755 |
| 6,618,263 | B1 | * | 9/2003  | Kin-Wing et al. | ............ | 361/759 |
| 7,203,076 | B1 | * | 4/2007  | Liang | ............................. | 361/801 |
| 7,326,077 | B2 | * | 2/2008  | Shih et al. | ..................... | 439/372 |
| 7,335,045 | B1 | * | 2/2008  | Liang | ................................ | 3/327 |
| 2010/0271768 | A1 | * | 10/2010 | Fan et al. | ................... | 361/679.4 |

* cited by examiner

*Primary Examiner* — Hung S Bui
(74) *Attorney, Agent, or Firm* — Steven M. Reiss

(57) ABSTRACT

A mounting apparatus for a PCI card includes a mounting bracket, a mounting piece for attaching the PCI card to the mounting bracket, and a securing member. The mounting bracket has a base and a blocking plate bent from the base. The mounting piece includes an elongated body and a mounting end bent from the elongated body. The elongated body adjoins the base and the mounting end abuts on the blocking plate. The securing member includes a first pivoting portion pivotably attached to the mounting bracket, a pressing portion extending from the pivoting portion, and a securing portion extending from the pressing portion. The pressing portion elastically abuts against the mounting end, thereby sandwiching the mounting end between the blocking plate and the pressing portion. The securing portion is for driving the pressing portion to move away from the mounting end by handling the securing portion.

17 Claims, 5 Drawing Sheets

MOUNTING APPARATUS FOR PCI CARD

BACKGROUND

1. Technical Field

The disclosure generally relates to mounting apparatuses, especially, to a mounting apparatus for a peripheral component interconnect (PCI) card.

2. Description of Related Art

PCI cards are widely to connect to computer network cards, monitor cards, sound cards or other peripheral devices. The conventional method for mounting PCI cards usually involves screws and screwdrivers in a tedious endeavor often resulting in lost screws. A screw falling on the printed circuit board (PCB) while the computer is on can result in damage to the PCB.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
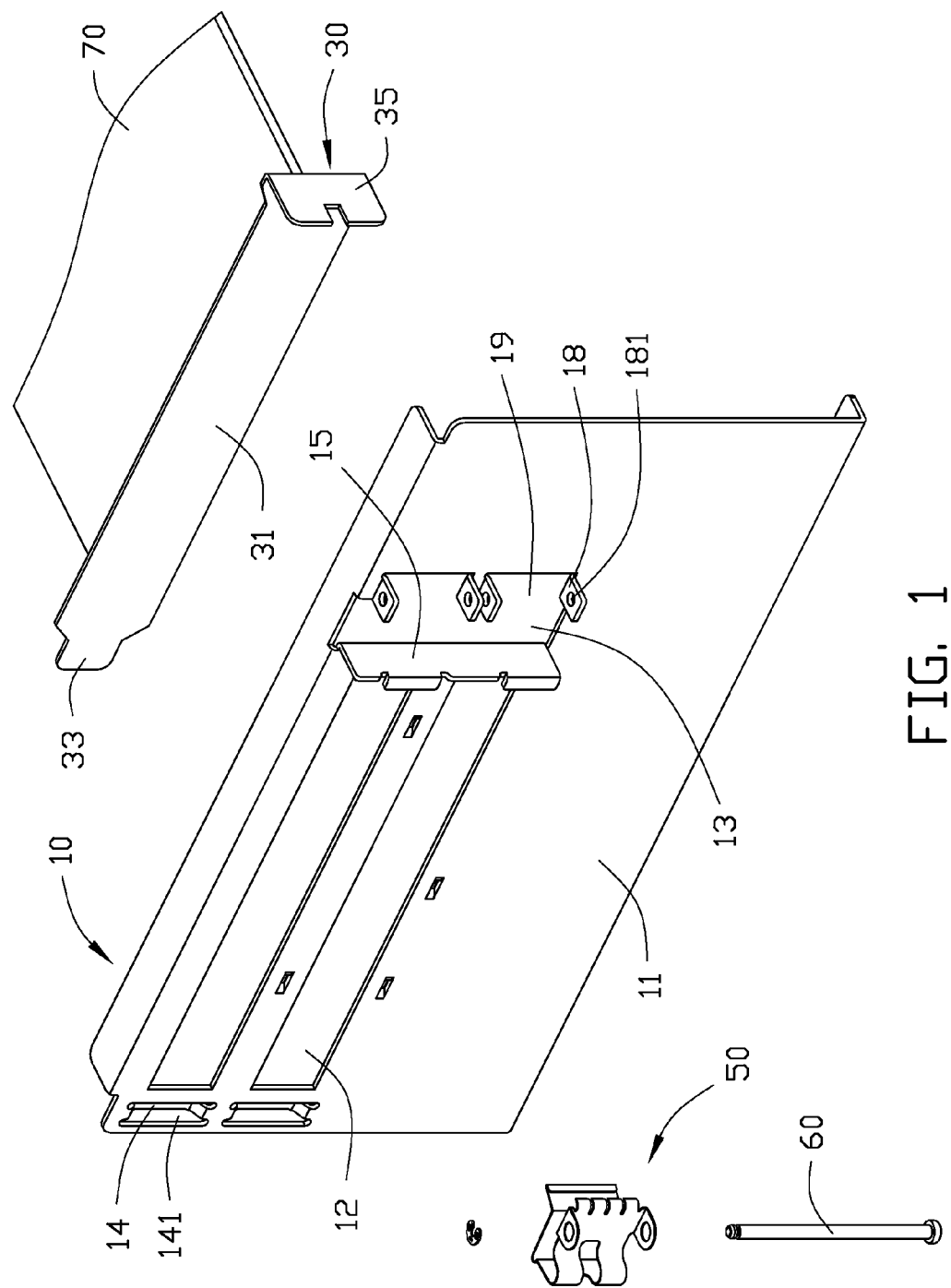
FIG. 1 is an exploded, isometric view of an exemplary embodiment of a mounting apparatus for PCI cards.

Referring to FIG. 1, an exemplary embodiment of a mounting apparatus for one PCI card 70 is shown. In the exemplary embodiment, a PCI card 70 is used. The mounting apparatus includes a mounting bracket 10, a mounting pieces 30 mounted on the PCI cards 70, and a securing member 50 pivotally mounted to the mounting bracket 10.

The mounting bracket 10 includes a rectangular base 11. Two elongated rectangular slots 12 are defined in the base 11. Two bridge portions 14 are formed on the base 11 adjacent one side of the elongated rectangular slots 12. Each bridge portion defines a securing slot 141. A mounting opening 13 is defined in the base 11 adjacent to the elongated rectangular slots 12. A blocking plate 15 is perpendicular to the base 11. The blocking plate 15 extends from a side edge of the mounting opening 13 adjacent to the elongated rectangular slots 12. A plurality of pivoting portions 18 are formed at the other side edge of the mounting opening 13. Each pivoting portion 18 defines a pivoting hole 181. A receiving notch 19 is defined between every two adjacent pivoting portions 18.

The mounting piece 30 includes an elongated body 31, an insertion end 33, and a mounting end 35. The elongated body 31 is for covering the corresponding elongated rectangular slot 12. The insertion end 33 extends from one side of the elongated body 31 for insertion in the securing slot 141. The mounting end 35 extends from the other side of the elongated body 31 for mounting on the blocking plate 15.

Figure 2:
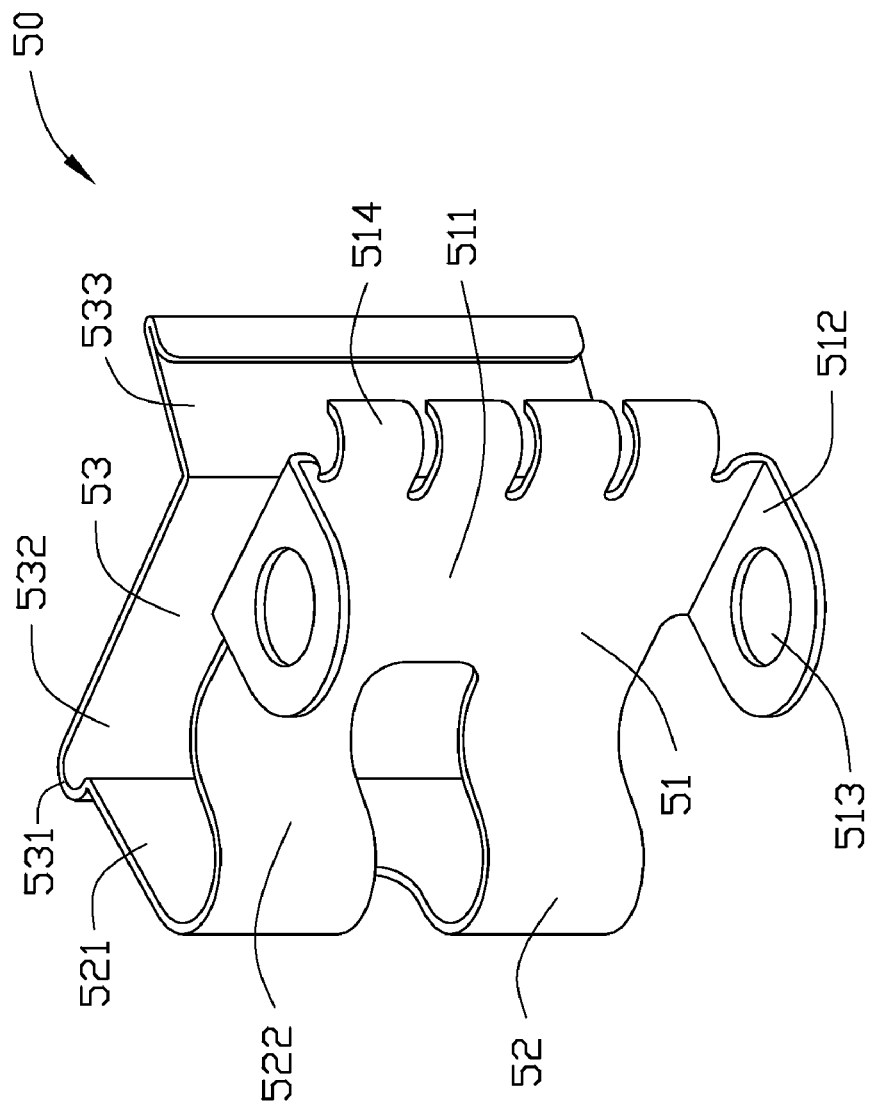
FIG. 2 is an enlarged isometric view of a securing member of FIG. 1.

Referring to FIG. 2, the securing member 50 includes a pivoting portion 51, a pressing portion 52, and a securing portion 53. The pressing portion 52 extends from the pivoting portion 51 and the securing portion 53 extends from the pressing portion 52.

The pivoting portion 51 includes a body 511, pivoting tabs 512 bent from opposite sides of the body 511, and an arcuate end portion 514 for avoiding contact with the mounting bracket when the pivoting portion 51 is pivoted farther from the mounting bracket 10. Each pivoting tab 512 defines a pivoting hole 513.

The pressing portion 52 is generally U-shaped. The pressing portion 52 includes a pressing body 521 and an elastic bending portion 522 extending from the pressing body 521. The pressing body 521 is for resisting the mounting end 35 of the mounting piece 30 to the blocking plate 15. The connecting portion 522 connects to the body 511.

The securing portion 53 includes a blocking portion 531, a connecting plate 532 extending from the blocking portion 531, and a handling portion 533 bent from the connecting plate 532. The handling portion 533 is oblique to the connecting plate 532. The blocking portion 531 is arcuate.

Figure 3:
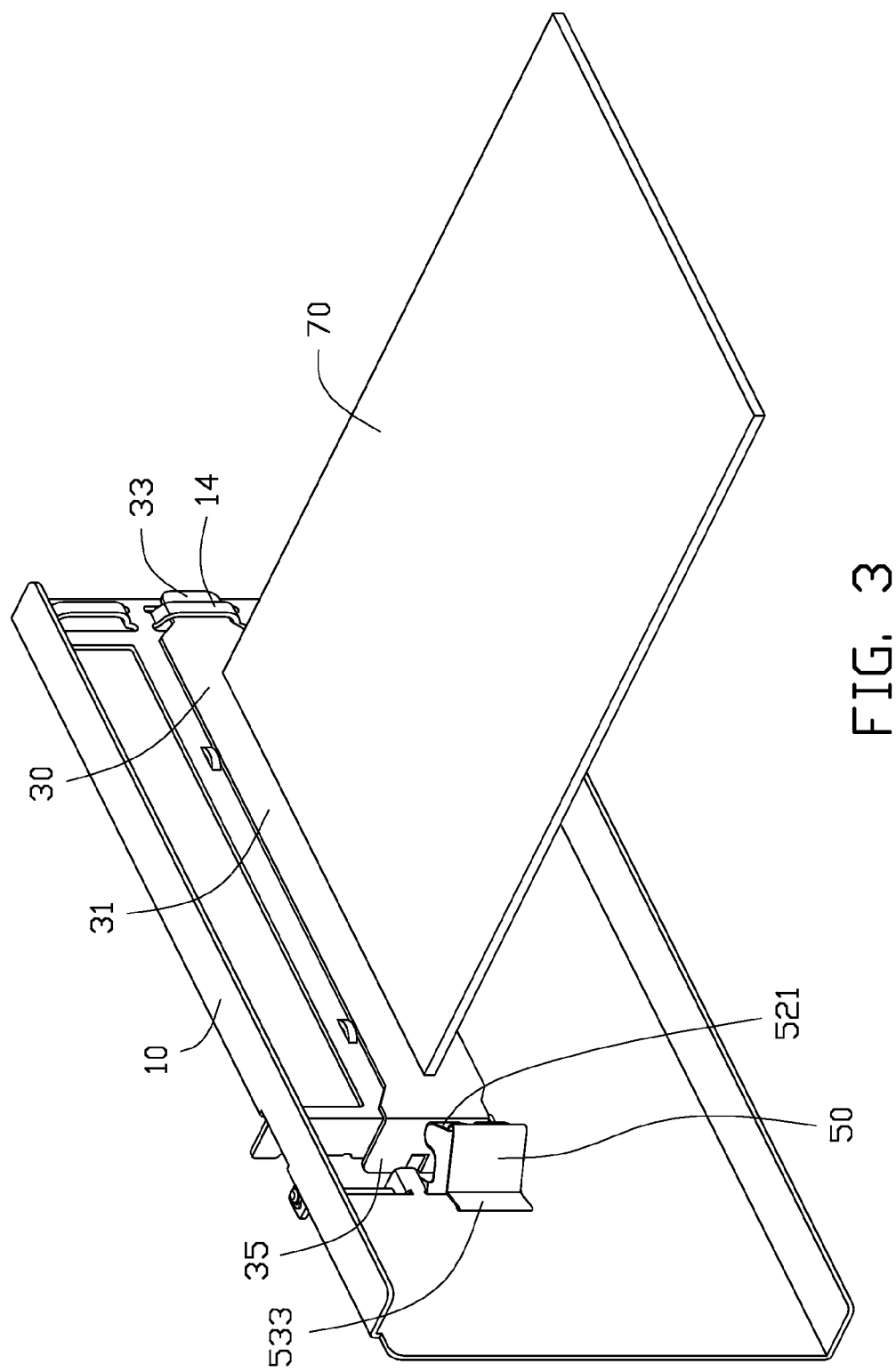
FIG. 3 is a pre-assembled view of FIG. 1.
Figure 4:
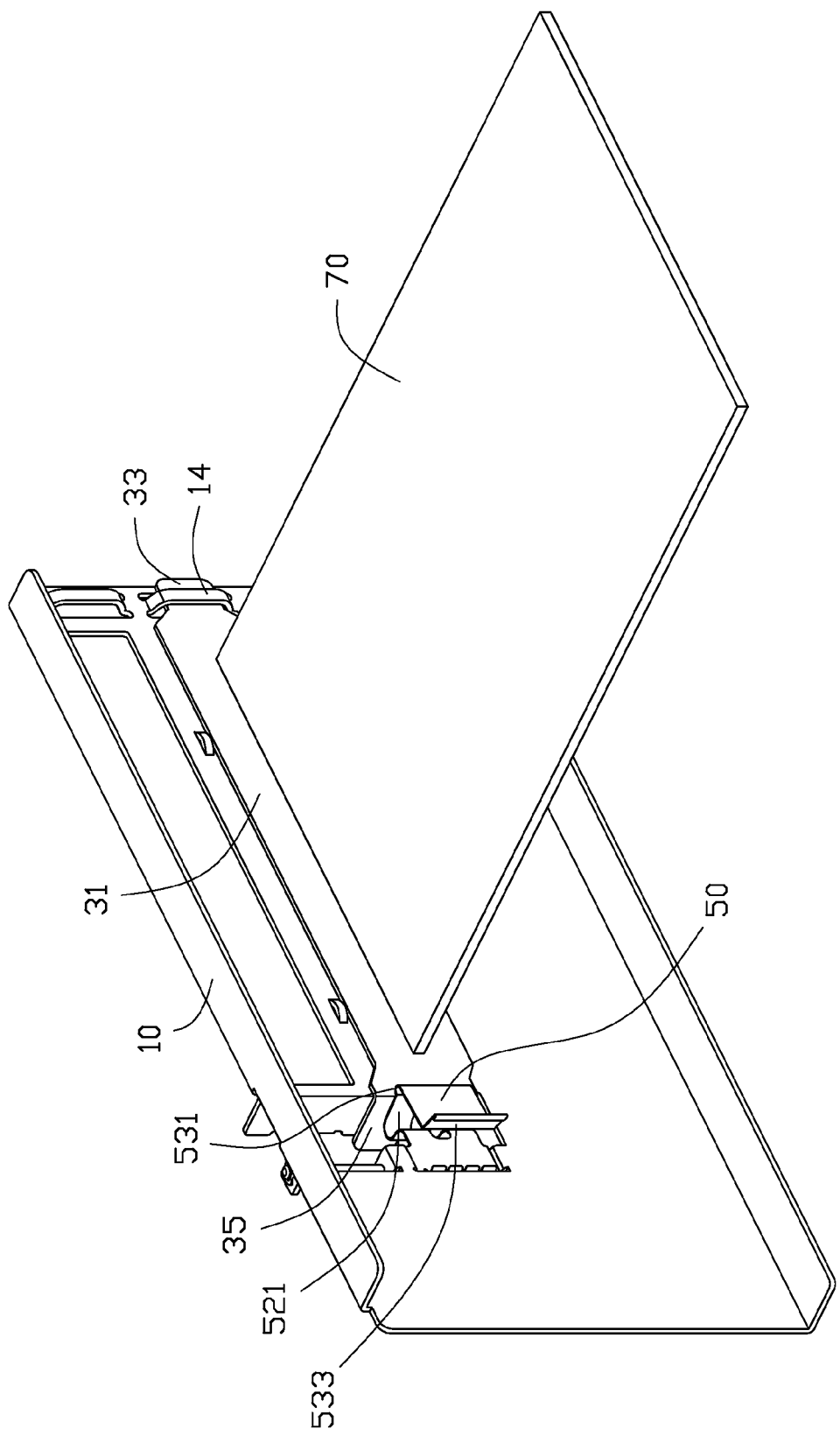
FIG. 4 is an assembled view of FIG. 1.
Figure 5:
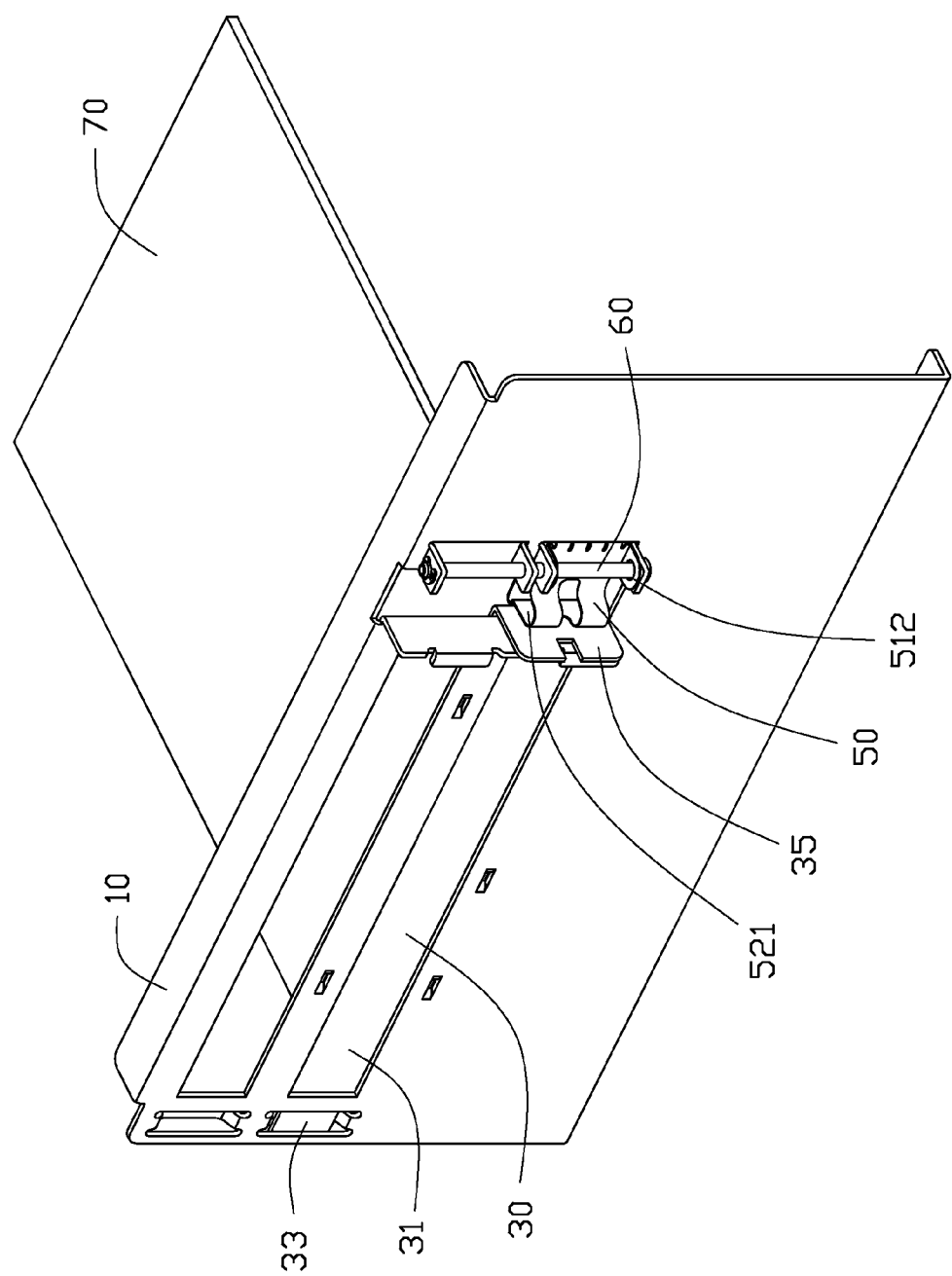
FIG. 5 is similar to FIG. 4, but viewed from another aspect.

Referring to FIGS. 3 to 5, in assembly, the elongated body 31 of the mounting piece 30 covers the corresponding elongated rectangular slot 12. The insertion end 33 of the mounting piece 30 is inserted into the securing slots 141 and the mounting end 35 of the mounting piece 30 abuts the blocking plate 15 by the mounting opening 13. The pivoting portion 51 of the securing member 50 is received in the receiving notch 19. A pivoting fastener 60 is inserted in the pivoting holes 181 and the pivoting holes 513 to pivotally attach the securing member 50 to the base 11 of the mounting bracket 10. Then, the securing member 50 is pivoted to move close to the base 11. The pressing body 521 of the pressing portion 2 abuts against the mounting end 35 of the securing member 50. The blocking portion 531 of the securing member 50 abuts on the elongated body 31 when the securing member 50 is continuously pivoted. The securing members 50 are securely mounted on the mounting bracket 10. The pressing body 521 abuts against the mounting end 35 of the mounting piece 30. The elastic bending portion 522 of the pressing portion 52 deform to tightly sandwich the mounting end 35 between the blocking plate 15 and the pressing body 521.

In disassembly, the handling portion 533 of the securing portion 53 is pushed in a direction substantially perpendicular to the pressing body 521. The pressing body 521 is driven to move close to the elastic bending portion 522 to elastically deform the elastic bending portion 522, thereby moving the pressing body 521 away from the mounting end 35 of the mounting piece 30. Thus, the PCI card 70 can be easily removed from the mounting bracket 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for a PCI card, comprising:
   a mounting bracket having a base and a blocking plate bent from the base;
   a mounting piece for attaching the PCI card to the mounting bracket, the mounting piece comprising an elongated body and a mounting end bent from the elongated body, the elongated body adjoining the base, the mounting end abutting the blocking plate; and
   a securing member comprising a first pivoting portion pivotably attached to the mounting bracket, a pressing portion extending from the pivoting portion, and a securing portion extending from the pressing portion, the pressing portion elastically abutting against the mounting end, thereby sandwiching the mounting end between the blocking plate and the pressing portion, the securing portion for driving the pressing portion away from the mounting end;

wherein the pressing portion comprises a pressing body abutting against the mounting end and an elastic bending portion extending from the pressing body, the elastic bending portion connecting to the first pivoting portion.

2. The mounting apparatus for a PCI card of claim 1, wherein the pressing portion is U-shaped.

3. The mounting apparatus for a PCI card of claim 1, wherein the securing portion comprises a blocking portion connecting to the pressing portion, and the blocking portion abuts the elongated body.

4. The mounting apparatus for a PCI card of claim 3, wherein the securing portion further comprises a connecting plate connecting to the blocking portion and a handling portion extending from the connecting plate, the handling portion for driving the pressing portion away from the mounting end by handling the handling portion.

5. The mounting apparatus for a PCI card of claim 4, wherein the handling portion is oblique to the connecting plate.

6. The mounting apparatus for a PCI card of claim 3, wherein the blocking portion is arcuate.

7. The mounting apparatus for a PCI card of claim 1, wherein the first pivoting portion comprises a body and two pivoting tabs extending from two opposite sides of the body, each tab defining a first pivoting hole; the blocking plate comprises a second pivoting portion, the second pivoting portion defines a second pivoting hole corresponding to the first pivoting hole.

8. The mounting apparatus for a PCI card of claim 7, wherein the first pivoting portion comprises an arcuate end portion for avoiding contact with the mounting bracket if the first pivoting portion is pivoted.

9. A mounting apparatus for a PCI card, comprising:
a mounting bracket having a slot and an opening adjacent to the slot, and a blocking plate disposed between the slot and the opening;
a mounting piece adapted to attach the PCI card to the mounting bracket, the mounting piece comprising an elongated body and a mounting end extending from the elongated body, the elongated body covering the slot, the mounting end abutting on the blocking plate of the mounting bracket; and
a securing member pivotably attached to the mounting bracket, the securing member comprising a pressing portion and a securing portion extending from the pressing portion; the pressing portion resiliently received in the opening, the mounting end being located between the blocking plate and the pressing portion, the securing portion configured for driving the pressing portion to move away from the mounting end.

10. The mounting apparatus for a PCI card of claim 9, wherein the pressing portion comprises a pressing body abutting against the mounting end and an elastic bending portion extending from the pressing body.

11. The mounting apparatus for a PCI card of claim 9, wherein the pressing portion is U-shaped.

12. The mounting apparatus for a PCI card of claim 9, wherein the securing portion comprises a blocking portion connecting to the pressing portion, and the blocking portion abuts on the elongated body.

13. The mounting apparatus for a PCI card of claim 12, wherein the securing portion further comprises a connecting plate connecting to the blocking portion and a handling portion extending from the connecting plate, the handling portion for moving the pressing portion away from the mounting end by handling the handling portion.

14. The mounting apparatus for a PCI card of claim 13, wherein the handling portion is oblique to the connecting plate.

15. The mounting apparatus for a PCI card of claim 12, wherein the blocking portion is arcuate.

16. The mounting apparatus for a PCI card of claim 9, wherein the securing member comprises a first pivoting portion, the first pivoting portion comprising a body and two pivoting tabs extending from two opposite sides of the body, each tab defining a first pivoting hole; the blocking plate comprises a second pivoting portion, the second pivoting portion defines a second pivoting hole corresponding to the first pivoting hole.

17. The mounting apparatus for a PCI card of claim 16, wherein the first pivoting portion comprises an arcuate end portion for avoiding contact with the mounting bracket if the first pivoting portion is pivoted.

\* \* \* \* \*